United States Patent
Younger

(10) Patent No.: US 8,117,750 B2
(45) Date of Patent: Feb. 21, 2012

(54) CLIP FOR LIMITING MOTION OF A TORQUE CONVERTER CLUTCH REGULATOR VALVE

(76) Inventor: Steven W. Younger, Hacienda Heights, CA (US)

( * ) Notice: Subject to any disclaimer, the term of this patent is extended or adjusted under 35 U.S.C. 154(b) by 485 days.

(21) Appl. No.: 12/360,768

(22) Filed: Jan. 27, 2009

(65) Prior Publication Data

US 2010/0186209 A1    Jul. 29, 2010

(51) Int. Cl.
*B21K 1/22* (2006.01)

(52) U.S. Cl. ............ 29/888.42; 29/888.46; 137/15.17; 137/15.18

(58) Field of Classification Search ........... 29/402.03, 29/888.42, 888.46, 888.4; 137/315.09, 15.17, 137/15.18, 315.11, 454.2; 24/546
See application file for complete search history.

(56) References Cited

U.S. PATENT DOCUMENTS

| | | | |
|---|---|---|---|
| 2,891,422 A * | 6/1959 | Rawley | 74/491 |
| 4,226,200 A * | 10/1980 | Morisawa et al. | 74/606 R |
| 4,308,765 A | 1/1982 | Iwanaga | |
| 4,313,354 A | 2/1982 | Iwanaga | |
| 4,347,765 A | 9/1982 | Leonard et al. | |
| 4,449,426 A * | 5/1984 | Younger | 477/127 |
| 4,506,564 A | 3/1985 | Coutant | |
| 5,157,608 A | 10/1992 | Sankpal et al. | |
| 5,460,582 A | 10/1995 | Palansky et al. | |
| 5,503,601 A * | 4/1996 | Bastio | 475/116 |
| 5,612,874 A | 3/1997 | Schultz et al. | |
| 6,543,472 B2 | 4/2003 | Stafford | |
| 6,585,002 B2 | 7/2003 | Stafford | |
| 6,722,385 B1 | 4/2004 | Bolaski | |
| 6,832,632 B1 | 12/2004 | Wallace | |
| 6,990,996 B2 | 1/2006 | Stafford | |
| 7,104,273 B1 * | 9/2006 | Stafford | 137/15.17 |
| 2001/0031681 A1 * | 10/2001 | Green | 475/129 |
| 2009/0199403 A1 * | 8/2009 | Younger | 29/890.121 |

* cited by examiner

*Primary Examiner* — David Bryant
*Assistant Examiner* — Ryan J Walters
(74) *Attorney, Agent, or Firm* — Kenneth L. Green

(57) ABSTRACT

An apparatus and method for repairing an automatic transmission. Access is obtained to the valve body and a special shaped Torque Converter Clutch (TCC) regulator apply valve clip is inserted against a TCC regulator apply valve to hold a TCC regulator apply valve in a fully open position. The clip is dished to avoid wear when engaging the TCC regulator apply valve and has an asymmetric top portion which cooperates with the shape of the valve body chamber the TCC regulator apply valve clip is inserted into, to ensure proper placement.

17 Claims, 4 Drawing Sheets

CLIP FOR LIMITING MOTION OF A TORQUE CONVERTER CLUTCH REGULATOR VALVE

BACKGROUND OF THE INVENTION

The present invention relates to the repair of automatic transmissions and in particular to a simple method using a low cost clip to repair an automatic transmission by limiting the movement of a Torque Converter Clutch (TCC) regulator apply valve in General Motors 4L60E, 4L65E, and 4L70E automatic transmissions.

TCCs are incorporated into automatic transmissions to lock a torque converter to provide better efficiency. During unlocked operation, for example, at startup, the torque convert provides torque multiplication and smooths impulses from the engine. Unfortunately, torque converters reduce overall power train efficiency by about ten percent. At higher speeds, the torque multiplication and smoothness is not required, and the TCC may be applied to directly couple the torque converter input from the engine to the automatic transmission, thereby eliminating the inefficiency otherwise experienced.

A TCC oil circuit controls flows and pressures of oil between the TCC valve and the torque converter. Known TCC operation is described as follows. When operating conditions for engaging the TCC are met, a Powertrain Control Module (PCM) energizes the TCC on-off solenoid. Energizing the TCC on-off solenoid causes the TCC on-off solenoid to close, shifting the TCC valve, thereby switching fluid connections in the TCC valve. Switching the fluid connections in the TCC valve results in pressure being released in the converter release circuit and converter release oil exhausting at the converter clutch valve down through check ball #9 on the end of the torque converter turbine shaft (sometimes called "input shaft"). Simultaneously, a regulator apply circuit is connected to a converter apply circuit pressure equal to the pressure in the regulator apply circuit. The oil pressure in the oil circuit is applied to a converter lockup apply piston in the torque converter to lock the TCC.

Pressure regulation in the regulator apply circuit is controlled as described in the following. An actuator feed limit valve regulates pressure in a pressure regulated circuit. The pressure regulated circuit is further regulated by a TCC Pulse Width Modulator (PWM) regulator solenoid. Pressure in the pressure regulator circuit pushes the isolator valve into the TCC regulator apply valve opening the TCC regulator apply valve to increase pressure to the desired oil pressure level.

Unfortunately, wear occurs in the TCC regulator apply valve 24 and isolator valve 25 body bores due to an oscillation inherent to the operation of the TCC PWM regulator solenoid acting on the TCC regulator and isolator valve. The wear results in a lower than required pressure in the converter apply circuit 20d. The TCC PWM regulator solenoid is unable to compensate for reduced pressure, and additional leaking resulting from the wear, which results in the TCC slipping too much. A code 1870 (trans component slipping) results. The TCC slip code is then stored in the transmission computer causing the malfunction indicator lamp to light up on the dashboard. The code and resulting check engine light or malfunction indicator light keeps the vehicle from being registered in most US states making repairs necessary. Generally, the automatic transmission is repaired by replacing the valve body at a cost of $300.00 dollars or more, by using fixtures to ream out and use oversize valves, or by a tedious and time consuming process of using different shims selected to fit the four or more different types of original equipment valves and other aftermarket valves. A less expensive method of repairing the common failure is needed.

BRIEF SUMMARY OF THE INVENTION

The present invention addresses the above and other needs by providing an apparatus and method for repairing an automatic transmission. Access is obtained to the valve body and a special shaped Torque Converter Clutch (TCC) regulator apply valve clip is inserted against a TCC regulator apply valve to hold a TCC regulator apply valve in a fully open position. The clip is dished to avoid wear when engaging the TCC regulator apply valve and has an asymmetric top portion which cooperates with the shape of the valve body chamber the TCC regulator apply valve clip is inserted into, to ensure proper placement.

In accordance with one aspect of the invention, there is provided a method for repairing an automatic transmission. The method includes removing an automatic transmission oil sump pan from the automatic transmission, removing a valve body exposed by removing the oil sump pan from the automatic transmission and separating the valve body from a separator plate, positioning a Torque Converter Clutch (TCC) regulator valve in an open position, inserting a TCC regulator apply valve clip into an open chamber of the valve body to engage the spool area of the TCC regulator apply valve with a convex dished side of the TCC regulator apply valve clip extending in the opening direction of the TCC regulator apply valve, reinstalling the valve body and separator plate, and reinstalling the automatic transmission oil sump pan. The TCC regulator apply valve is positioned in the open chamber to align a spool area of the TCC regulator apply valve with the open chamber of the valve body and TCC regulator apply valve clip is inserted into the open chamber of the valve body to engage the spool area of the TCC regulator apply valve with an elongated portion of the TCC regulator apply valve clip facing away from a proximal end of the open chamber. The TCC regulator apply valve clip thus allows the blocking of the TCC regulator apply valve in the open position without the removal of the TCC regulator apply valve from the valve body.

Installation of the TCC regulator apply valve clip according to the present invention causes the oil pressure in the regulator apply circuit to be equal to pump line pressure because the TCC PWM regulator solenoid no longer regulates the pressure in the regulator apply circuit to be less than the pump line pressure. Insertion of the TCC regulator apply valve clip holds the TCC regulator apply valve open in the full apply position and is no longer affected by computer commands from the Powertrain Control Module (PCM) and wear of the isolator valve no longer reduces pressure in the regulator apply circuit. Pressure in the converter apply circuit is then controlled by the TCC on-off solenoid only, resulting in slightly firmer, but acceptable, TCC engagement. Significantly, the code 1870 (transmission component slipping) is corrected without costly repairs.

In accordance with another aspect of the invention, there is provided a TCC regulator apply valve clip which works on a variety of TCC regulator apply valve designs thus requiring stocking only a single part for TCC regulator apply valve repairs.

In accordance with yet another aspect of the invention, there is provided a method for repairing the TCC regulator apply valve using the TCC regulator clip which blocks the TCC regulator apply valve the open position and does not require removal of the TCC regulator apply valve. The TCC regulator apply valve is moved to the open position and the TCC regulator clip is then inserted, thereby saving substantial time and cost in transmission repair.

In accordance with yet another aspect of the invention, there is provided a TCC regulator apply valve clip having a design which does not damage the valve body by raising a burr on the TCC regulator apply valve or on the TCC regulator apply valve bore. The TCC regulator apply valve clip is convexly dished to one side. The convex dish resides against a side of a land of the TCC regulator apply valve to hold the TCC regulator apply valve in the open position while avoiding contact between the TCC regulator apply valve clip and a cylindrical surface of the lands of the TCC regulator apply valve or the TCC regulator apply valve bore.

In accordance with yet another aspect of the invention, there is provided a TCC regulator apply valve clip which cannot be installed backwards. Because of an asymmetric top portion, the TCC regulator apply valve clip installs without possibility of wrong installation.

In accordance with yet another aspect of the invention, there is provided a TCC regulator apply valve clip which is installed under a valve body separator plate and cannot become dislodged once installed.

In accordance with yet another aspect of the invention, there is provided a permanent repair for a worn TCC regulator apply valve. Repairing the TCC regulator value by inserting the TCC regulator apply valve clip is a permanent repair because future wear of the TCC regulator apply valve is prevented, unlike installing a new valve body or reamed out valve bodies may experience the same failure in 70,000 miles.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
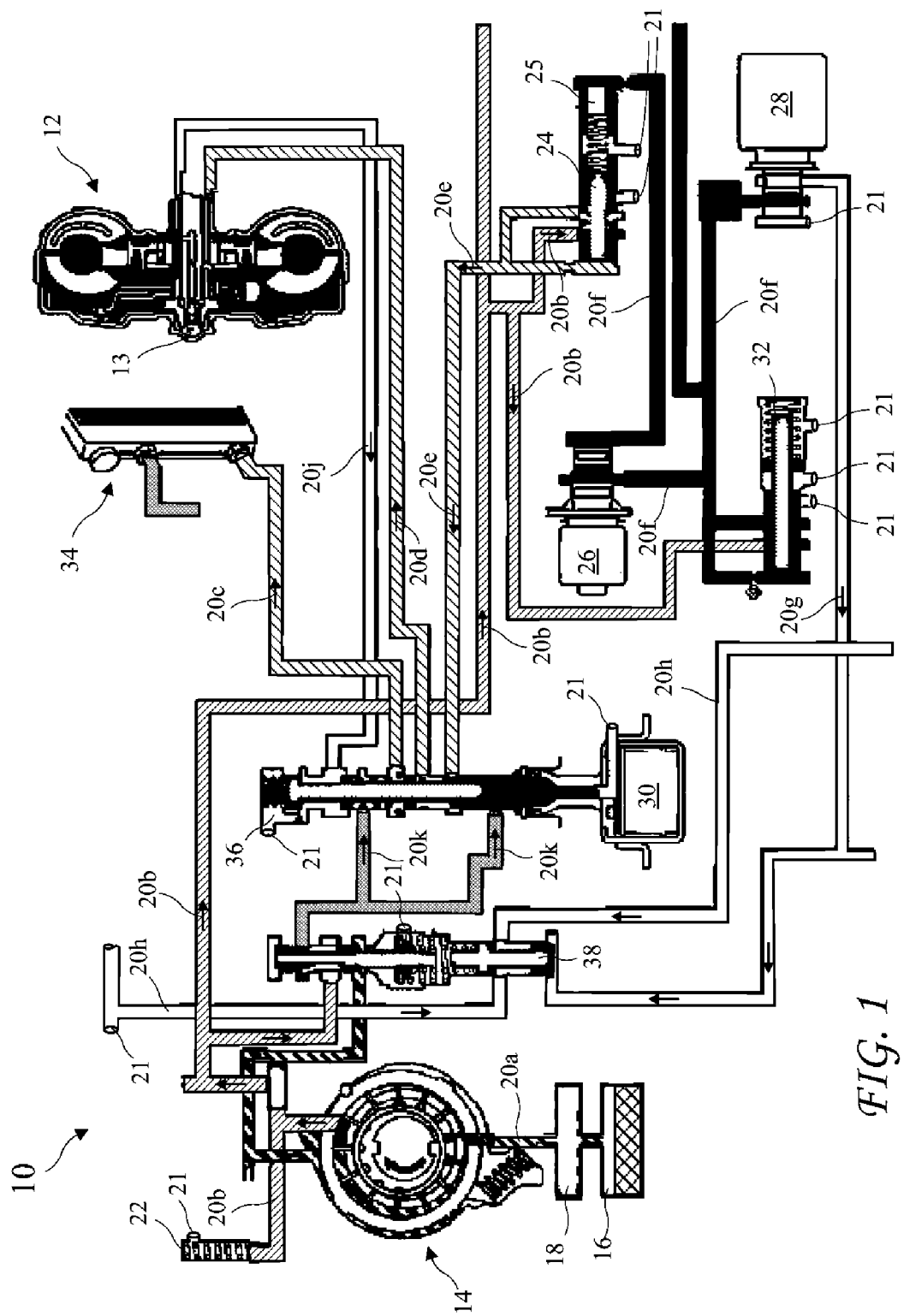
FIG. 1 is a Torque Converter Clutch (TCC) oil circuit diagram in a TCC applied position.

A Torque Converter Clutch (TCC) oil circuit diagram 10 in a TCC applied position is shown in FIG. 1. Transmission fluid 20a is drawn from an automatic transmission oil sump pan 16 and through a filter 18 by a pump 14. The fluid is circulated through the transmission in various flows 20a-20k to control the operation of the automatic transmission. Various exhaust points 21 are provided to release fluid to reduce pressure in selected ones the flows 20a-20k. A pump flow 20b at pump line pressure from the pump 14 is carried to a pressure relief valve 22, to a boost valve pressure regulator 38, a Torque Converter Clutch (TCC) regulator apply valve 24, and an actuator feed limit valve 32. The boost valve pressure regulator 38 controls a boost valve flow 20k to a TCC valve 36. The boost valve pressure regulator 38 is controlled by rev input flows 20h.

The actuator feed limit valve 32 limits the pressure in a pressure regulated circuit 20f from the actuator feed limit valve 32 to a TCC Pulse Width Modulation (PWM) solenoid 26 and to a pressure control solenoid 28. The pressure regulated circuit 20f, subject to modulation by the TCC PWM solenoid 26, controls an isolator valve 25 to control the position of the TCC regulator apply valve 24. Unfortunately, rapid motion of the isolator valve 25 caused by the modulation of the TCC PWM solenoid 26 causes wear and ultimately failure of the isolator valve 25.

The TCC regulator apply valve 24 controls the pressure of a regulator apply circuit 20e connecting the TCC regulator apply valve 24 to the TCC valve 36. The TCC valve 36 is controlled by a TCC on-off solenoid 30 which is controlled by a Powertrain Control Module (PCM) (not shown) to apply and release the TCC. The pressure of the circuit 20e is normally controlled by the TCC regulator apply valve 24 to regulate the pressure in a converter apply circuit 20d to the torque converter 12 which in turn controls applying the TCC.

Figure 2A:
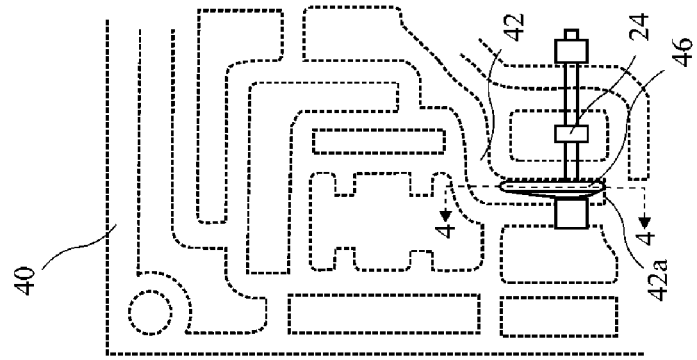
FIG. 2A is a more detailed view of portion 2A of the valve body showing the TCC regulator apply valve clip according to the present invention holding the TCC regulator apply valve in the open position.
Figure 2:
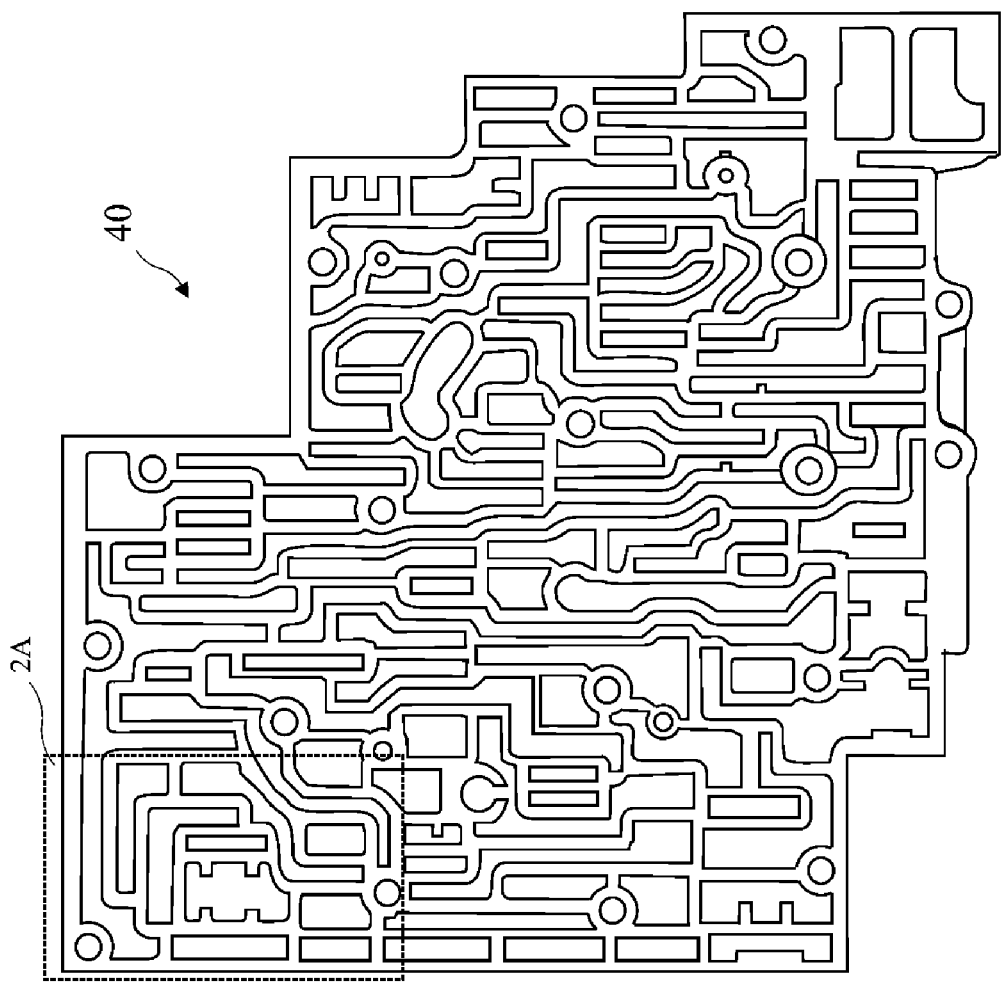
FIG. 2 is a valve body of the automatic transmission with a TCC regulator valve clip according to the present invention holding a TCC regulator apply valve in the open position.

A valve body 40 of the automatic transmission with a TCC regulator apply valve 24 is shown in FIG. 2 and a more detailed view of a portion 2A of the valve body 40 showing a TCC regulator apply valve clip 46 according to the present invention, holding the TCC regulator apply valve 24 open, is shown in FIG. 2A. The TCC regulator apply valve clip 46 resides in a chamber (or passage) 42 of the valve body 40. The TCC regulator apply valve clip 46 is positioned over the TCC regulator apply valve 24 to restrict motion of the TCC regulator apply valve 24 to maintain the TCC regulator apply valve 24 in an open position to provide full pump line pressure through the regulator apply circuit 20e to the TCC valve 36 at all times to overcome wear of the isolator valve 25. The TCC regulator apply valve clip 46 is inserted into the chamber 42 so that an asymmetrical top portion 46a (see FIG. 3A) of the TCC regulator apply valve clip 46 is pointed away from the proximal wall 42a of the chamber 42.

Figure 3A:
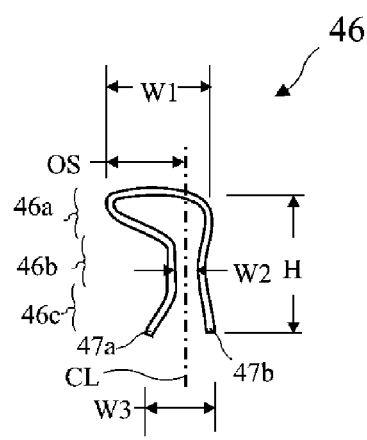
FIG. 3A is a front view of the TCC regulator apply valve clip according to the present invention.
Figure 3B:
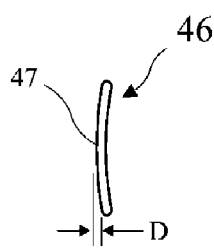
FIG. 3B is a right side view of the TCC regulator apply valve clip according to the present invention.

A front view of the TCC regulator apply valve clip 46 according to the present invention is shown in FIG. 3A and a right side view of the TCC regulator apply valve clip 46 is shown in FIG. 3B. The TCC regulator apply valve clip 46 has a height H, a top portion 46a width W1, and center portion 46b inside width W2, and a bottom portion 46c width W3. A vertical center line CL is centered on the center portion of the TCC regulator apply valve clip 46. The top portion 46a is laterally asymmetric and is offset on a left side of the center line CL by an offset OS. The TCC regulator apply valve clip 46 is also a dish 47 dished a distance D to the left when viewed from the right side. The height H is preferably between 0.945 inches and 1.155 inches and more preferably approximately 1.05 inches. The TCC regulator apply valve clip 46 preferably includes two legs 47a and 47b.

The width W1 is preferably between 0.625 inches and 0.69 inches and more preferably approximately 0.658 inches. The inside width W2 is preferable approximately 0.14 inches and is selected to provide a friction fit between the TCC regulator apply valve clip 46 center portion 46b and the spool area 24a (see FIG. 5) so that the TCC regulator apply valve clip 46 will not fall out of the valve body 40 during reassembly of the automatic transmission. The width W3 is preferably between 0.29 inches and 0.36 inches and more preferably approximately 0.305 inches, and the offset OS is preferably approximately 0.45 inches. The dish distance D is preferably between 0.0225 inches and 0.0275 inches and more preferably approximately 0.025 inches.

Figure 3C:
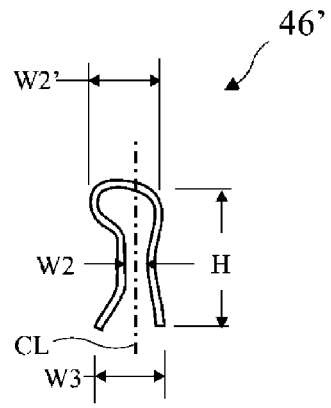
FIG. 3C is a front view of a second embodiment of a TCC regulator apply valve clip according to the present invention.

A front view of a second embodiment of a TCC regulator apply valve clip 46' according to the present invention is shown in FIG. 3C. The TCC regulator apply valve clip 46' is similar to the TCC regulator apply valve clip 46, except does not include the asymmetric top portion 46a of the TCC regulator apply valve clip 46 and has a top portion width W2' approximately equal to the bottom portion width W3. As a result, a mechanic installing the TCC regulator apply valve clip 46' must ensure that the dish 47 is facing in the side 24c of the land 24b of the TCC regulator apply valve 24.

Figure 3D:
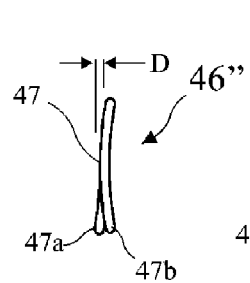
FIG. 3D is a right side view of an embodiment of the TCC regulator apply valve clip with one leg reaching forward according to the present invention.

A right side view of an embodiment of the TCC regulator apply valve clip with the leg 47a reaching forward ahead of the leg 47b is shown in FIG. 3D.

The TCC regulator apply valve clips 46 and 46' are preferably made from wire and more preferably from music wire, which wire is preferably between 0.030 and 0.078 inches in diameter and most preferably approximately 0.048 inches in diameter. The clip may alternative be a stamped part having the same height, overall width, and dish as the TCC regulator apply valve clips 46 and 46' described above, with a vertical channel in the bottom portion and middle portion with an inside width W2.

Figure 4:
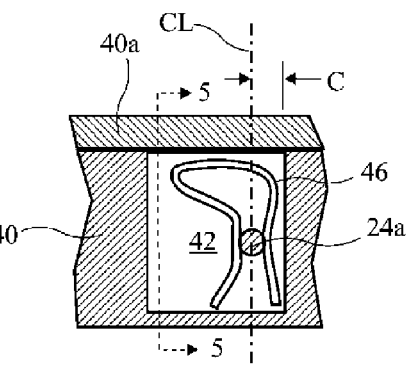
FIG. 4 is a cross-sectional view taken along line 4-4 of FIG. 2A of the TCC regulator apply valve clip according to the present invention in a chamber of the valve body engaging the TCC regulator apply valve.
Figure 5:
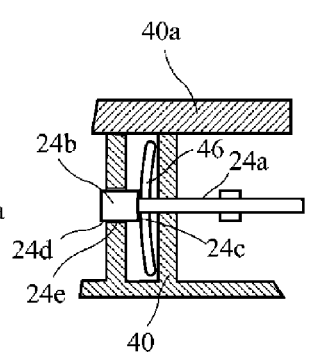
FIG. 5 is a cross-sectional view taken along line 5-5 of FIG. 4 of the TCC regulator apply valve clip according to the present invention in the chamber of the valve body engaging the TCC regulator apply valve.

A cross-sectional view taken along line 4-4 of FIG. 2A of the TCC regulator apply valve clip 46 according to the present invention in the chamber 42 of the valve body 40 engaging the TCC regulator apply valve 24 is shown in FIG. 4 and a cross-sectional view taken along line 5-5 of FIG. 4 of the TCC regulator apply valve clip 46 in the chamber 42 of the valve body engaging the TCC regulator apply valve 24 is shown in FIG. 5. A spool area 24a of the TCC regulator apply valve 24 is engaged by center portion of the TCC regulator apply valve clip 46 and the dish 47 (see FIG. 3B) resides against a side 24c of a land 24b of the TCC regulator apply valve 24 holding the TCC regulator apply valve 24 in the open position to provide full pump line pressure to the regulator apply circuit 20e (see FIG. 1). The offset top portion of the TCC regulator apply valve clip 46 prevents installing the TCC regulator apply valve clip 46 backward and a valve body separator plate 40a retains the TCC regulator apply valve clip 46 in place. The convex dish 47 resides against a side 24c of the land 24b of the TCC regulator apply valve 24 to hold the TCC regulator apply valve 24 in the open position while avoiding contact between the TCC regulator apply valve clip 46 and a cylindrical surface 24d of the lands 24b of the TCC regulator apply valve 24 or a TCC regulator apply valve bore 24e.

Figure 6:
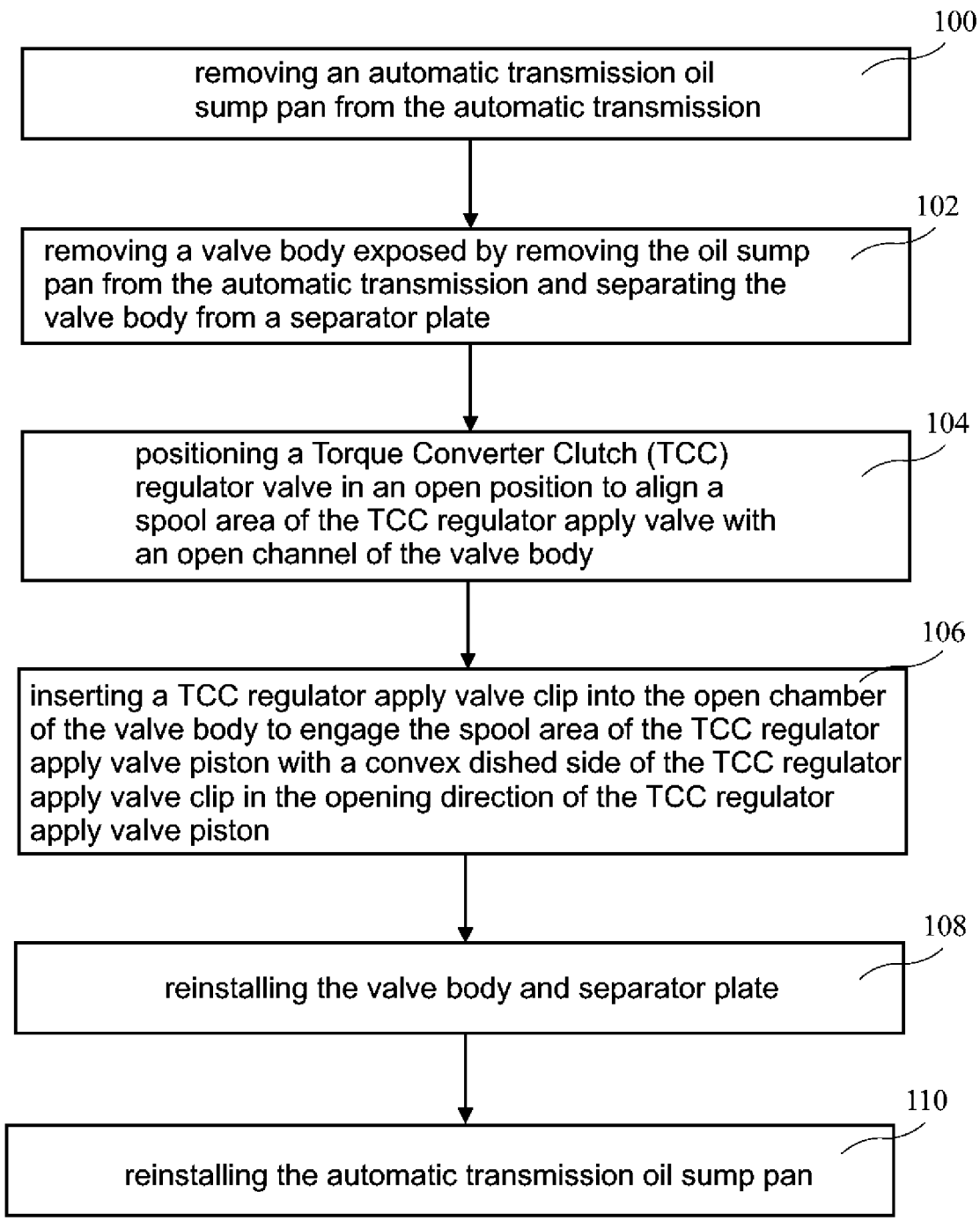
FIG. 6 is a method according to the present invention for repairing an automatic transmission.

A method according to the present invention for repairing an automatic transmission is described in FIG. 6. The method includes the steps of removing an automatic transmission oil sump pan from the automatic transmission at step 100, removing a valve body exposed by removing the oil sump pan from the automatic transmission and separating the valve body from a separator plate at step 102, positioning a Torque Converter Clutch (TCC) regulator valve in an open position to align a spool area of the TCC regulator apply valve with an open chamber of the valve body at step 104, inserting a TCC regulator apply valve clip into the open chamber of the valve body to engage the spool area of the TCC regulator apply valve with a convex dished side of the TCC regulator apply valve clip in the opening direction of the TCC regulator apply valve at step 106, reinstalling the valve body and separator plate at step 108, and reinstalling the automatic transmission oil sump pan at step 110.

While the invention herein disclosed has been described by means of specific embodiments and applications thereof, numerous modifications and variations could be made thereto by those skilled in the art without departing from the scope of the invention set forth in the claims.

I claim:

1. A method for repairing an automatic transmission, the method comprising:

removing an automatic transmission oil sump pan from the automatic transmission;

removing a valve body exposed by removing the oil sump pan from the automatic transmission and separating the valve body from a separator plate;

positioning a Torque Converter Clutch (TCC) regulator apply valve in an open position to align a spool area of the TCC regulator apply valve with an open chamber of the valve body;

inserting a TCC regulator apply valve clip into the open chamber of the valve body to engage the spool area of the TCC regulator apply valve thereby holding the TCC regulator apply valve in the open position, the TCC regulator apply valve clip comprising:

a height H between 0.945 inches and 1.155 inches;

an asymmetric top portion having a width W1 of between 0.625 inches and 0.69 inches;

a left side;

a right side;

a center portion having an interior width W2 of approximately 0.14 inches;

a vertical centerline of the center portion; and a bottom portion having legs extending down from the center portion;

reinstalling the valve body and separator plate; and reinstalling the automatic transmission oil sump pan.

2. The Method of claim 1, wherein inserting a TCC regulator apply valve clip into the open chamber of the valve body comprises inserting a TCC regulator apply valve clip into the open chamber of the valve body with an elongated side of an asymmetric top portion of the TCC regulator apply valve clip facing away from a proximal end of the open chamber.

3. The Method of claim 2, wherein inserting a TCC regulator apply valve clip into the open chamber of the valve body comprises inserting a TCC regulator apply valve clip having a convex dished side into the open chamber of the valve body with the elongated side of the TCC regulator apply valve clip facing away from the proximal end of the open chamber thereby positioning the convex dished side of the TCC regulator apply valve clip against a side of a land of the TCC regulator apply valve thereby holding the TCC regulator apply valve open.

4. The Method of claim 1, wherein inserting a TCC regulator apply valve clip into the open chamber of the valve body comprises inserting a TCC regulator apply valve clip into the open chamber of the valve body with a convex dished side of the TCC regulator apply valve clip against a side of a land of the TCC regulator apply valve thereby holding the TCC regulator apply valve open.

5. The Method of claim 1, wherein inserting a TCC regulator apply valve clip into the open chamber of the valve body comprises inserting a TCC regulator apply valve clip convexly dished a distance D of between 0.0225 inches and 0.0275 inches to the left when viewed from the right side.

6. The Method of claim 1, wherein inserting a TCC regulator apply valve clip into the open chamber of the valve body comprises inserting a TCC regulator apply valve clip having a laterally asymmetric top portion extending approximately 0.45 inches to the left of the vertical centerline.

7. The Method of claim 1, wherein inserting a TCC regulator apply valve clip into the open chamber of the valve body comprises inserting a TCC regulator apply valve clip having the legs including inner surface tapering outward and downward.

8. The Method of claim 1, wherein inserting a TCC regulator apply valve clip into the open chamber of the valve body comprises inserting a TCC regulator apply valve clip made from wire.

9. The method of claim 8, wherein inserting a TCC regulator apply valve clip into the open chamber of the valve body comprises inserting a TCC regulator apply valve clip made from music wire.

10. The method of claim 9, wherein inserting a TCC regulator apply valve clip into the open chamber of the valve body comprises inserting a TCC regulator apply valve clip made from music wire having a diameter between 0.030 inches and 0.078 inches.

11. The method of claim 10, wherein inserting a TCC regulator apply valve clip into the open chamber of the valve body comprises inserting a TCC regulator apply valve clip having the bottom portion having a width W3 between 0.29 inches and 0.36 inches.

12. A method for repairing an automatic transmission, the method comprising:
removing an automatic transmission oil sump pan from the automatic transmission;
removing a valve body exposed by removing the oil sump pan from the automatic transmission and separating the valve body from a separator plate;
positioning a Torque Converter Clutch (TCC) regulator apply valve in an open position to align a spool area of the TCC regulator apply valve with an open chamber of the valve body;
inserting a TCC regulator apply valve clip into the open chamber of the valve body to engage the spool area of the TCC regulator apply valve thereby holding the TCC regulator apply valve in the open position, the TCC regulator apply valve clip comprising:
a height H adapted to fit within the open chamber of the valve body;
an asymmetric top portion having a width W1 adapted to fit within the open chamber of the valve body;
a left side;
a right side;
a center portion having an inside width W2 to provide a friction fit between the TCC regulator apply valve clip center portion and the spool area;
a vertical centerline of the center portion; and
a bottom portion having legs extending down from the center portion;
reinstalling the valve body and separator plate; and
reinstalling the automatic transmission oil sump pan.

13. The Method of claim 12, wherein inserting a TCC regulator apply valve clip into the open chamber of the valve body comprises inserting a TCC regulator apply valve clip into the open chamber of the valve body with a convex dished side of the TCC regulator apply valve clip against a side of a land of the TCC regulator apply valve thereby holding the TCC regulator apply valve open.

14. The Method of claim 13, wherein inserting a TCC regulator apply valve clip into the open chamber of the valve body further comprises inserting a TCC regulator apply valve clip into the open chamber of the valve body with top and bottom edges of the clip residing against a common vertical wall of the chamber and with the convex dished side of the TCC regulator apply valve clip pushing against the side of the land of the TCC regulator apply valve thereby biasing the TCC regulator apply valve away from the common vertical wall.

15. A method for repairing an automatic transmission, the method comprising:
removing an automatic transmission oil sump pan from the automatic transmission;
removing a valve body exposed by removing the oil sump pan from the automatic transmission and separating the valve body from a separator plate;
positioning a Torque Converter Clutch (TCC) regulator apply valve in an open position to align a spool area of the TCC regulator apply valve with an open chamber of the valve body;
inserting a TCC regulator apply valve clip into the open chamber of the valve body to engage the spool area of the TCC regulator apply valve thereby holding the TCC regulator apply valve in the open position, the TCC regulator apply valve clip comprising:
a height H between 0.945 inches and 1.155 inches;
an asymmetric top portion having a width W1 of between 0.625 inches and 0.69 inches;
a left side;
a right side;
a center portion having an interior width W2 providing a friction fit between the TCC regulator apply valve clip center portion and the spool area;
a vertical centerline of the center portion; and
a bottom portion having legs extending down from the center portion;
reinstalling the valve body and separator plate; and
reinstalling the automatic transmission oil sump pan.

16. The Method of claim 15, wherein inserting a TCC regulator apply valve clip into the open chamber of the valve body comprises inserting a TCC regulator apply valve clip into the open chamber of the valve body with a convex dished side of the TCC regulator apply valve clip against a side of a land of the TCC regulator apply valve thereby holding the TCC regulator apply valve open.

17. The Method of claim 16, wherein inserting a TCC regulator apply valve clip into the open chamber of the valve body further comprises inserting a TCC regulator apply valve clip into the open chamber of the valve body with top and bottom edges of the clip residing against a common vertical wall of the chamber and with the convex dished side of the TCC regulator apply valve clip pushing against the side of the land of the TCC regulator apply valve thereby biasing the TCC regulator apply valve away from the common vertical wall.

* * * * *